Oct. 2, 1923.
R. P. CALLARD
1,469,379
SHEET GLASS DRAWING MECHANISM
Filed July 7, 1919   3 Sheets-Sheet 1
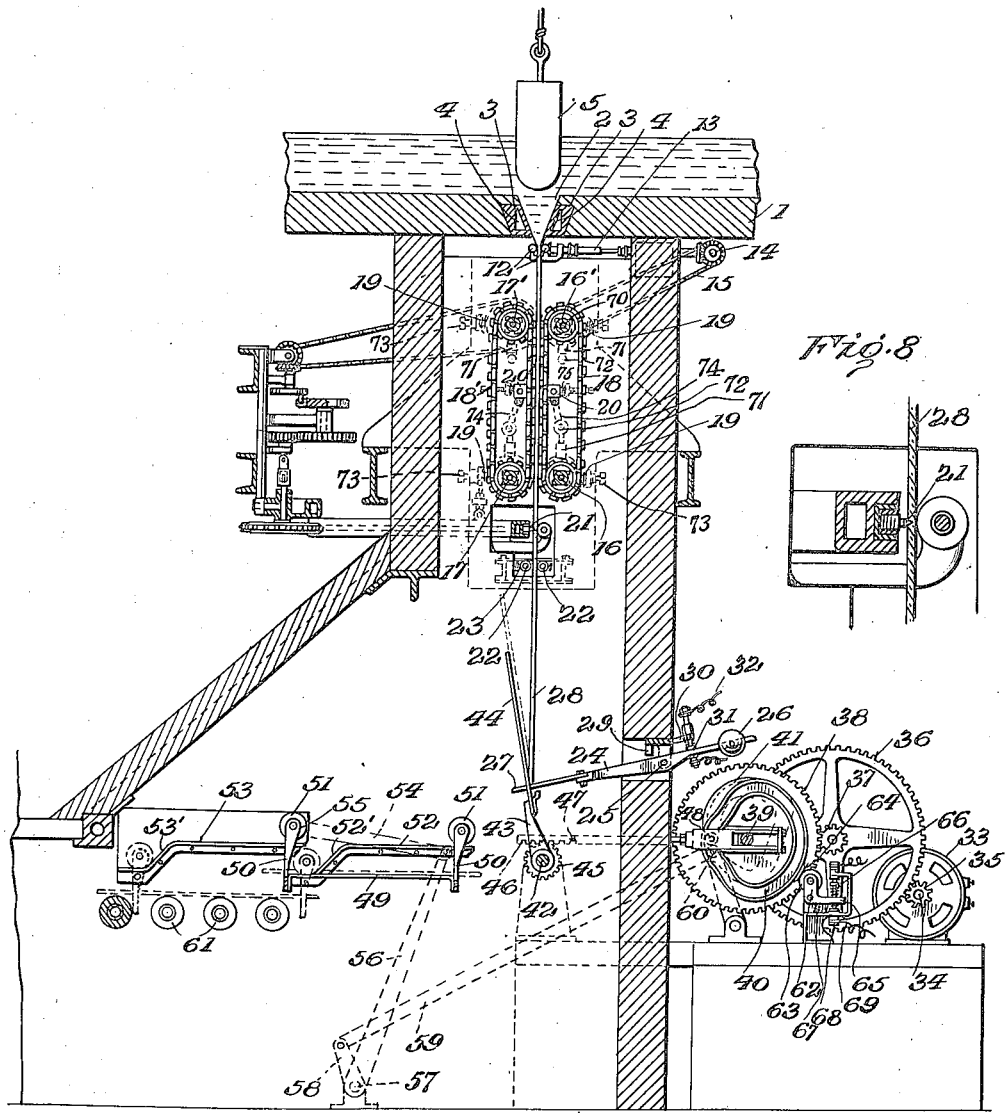

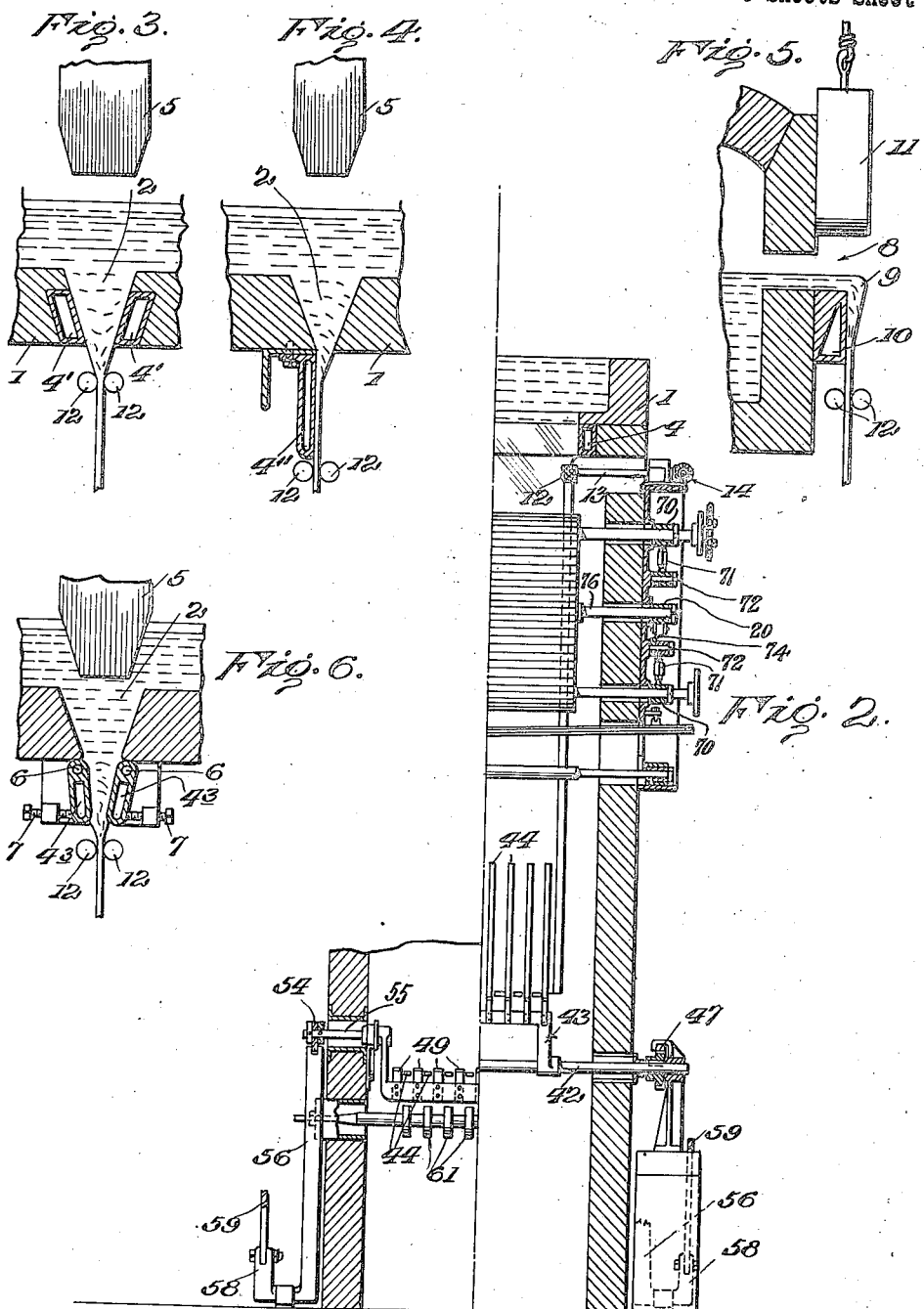

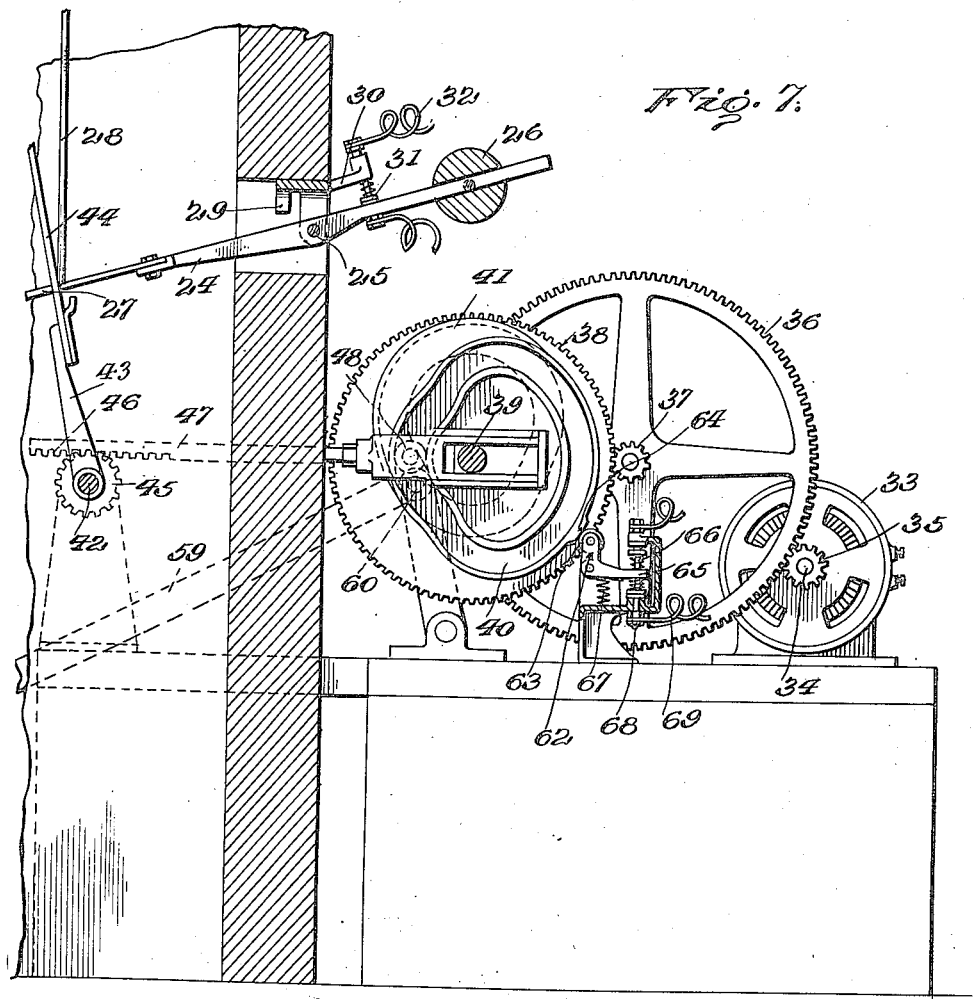

Patented Oct. 2, 1923.

1,469,379

UNITED STATES PATENT OFFICE.

ROBERT P. CALLARD, OF CHARLESTON, WEST VIRGINIA, ASSIGNOR TO THE LIBBEY-OWENS SHEET GLASS COMPANY, OF TOLEDO, OHIO, A CORPORATION OF OHIO.

SHEET-GLASS-DRAWING MECHANISM.

Application filed July 7, 1919. Serial No. 308,970.

*To all whom it may concern:*

Be it known that I, ROBERT P. CALLARD, a citizen of the United States of America, and a resident of Charleston, West Virginia, have invented a new and useful Improvement in Sheet-Glass-Drawing Mechanism, which invention is fully set forth in the following specification.

This invention relates to the art of drawing sheet glass and has for its object to provide mechanism for continuously drawing a sheet of glass, automatically dividing it into sections and delivering the severed sections automatically to a leer for annealing. With this object in view, the invention broadly consists in providing a long slot or opening in the bottom of a glass-melting furnace, or the fore-hearth thereof, through which molten glass flows in sheet form in juxtaposition to suitable temperature regulating devices for regulating the temperature of the molten glass, combined with width-maintaining devices and gripping or drawing mechanism to apply drawing power to the sheet, said mechanism acting in a vertically downward direction. After the sheet of glass passes the gripping mechanism which applies drafting power thereto, it is automatically acted upon by a transverse scoring device and is then received by a suitable carrier which operates to sever or break the sheet along the scored line while still in a substantially vertical position, and then to lay the severed sheet upon a transfer carriage, which automatically delivers it to the leer.

If desired, instead of a slotted opening through the bottom of the furnace, or fore-hearth, the glass may be permitted to flow over the open end of said furnace or fore-hearth in a thin shallow stream, the edges being acted upon by the width-maintaining devices and the gripping or drawing devices in the same way as when the glass flows in sheet form through an opening in the bottom of the furnace.

The inventive idea is capable of receiving a variety of mechanical expressions, one of which, for the sake of illustrating the invention, is shown in the accompanying drawings, in which—

Fig. 1 is a vertical transverse section through the fore-hearth of a glass melting furnace and the operating mechanism for drawing and severing the sheet and delivering the same to the leer, parts being shown in elevation.

Fig. 2 is a broken front elevation of the operating parts.

Figs. 3, 4, 5 and 6 are sectional detail views illustrating different forms of mechanism employed for delivering the glass in sheet form from said fore-hearth; Fig. 7 is a detail of the mechanism associated with the sheet carrier; and Fig. 8 is an enlarged sectional view of the means for scoring the sheet of glass.

Referring to the drawings, in which like reference numerals refer to like parts throughout the several views, 1 is a fore-hearth of any suitable glass melting furnace, provided with an opening 2, formed in the bottom thereof, which opening, as shown, is widest at its top and gradually tapers to a narrow slot at its bottom. Associated with said opening is a system of temperature regulating devices here shown in the form of hollow castings 3—3, located one on each side of said opening, through which a temperature regulating medium, as water, may be circulated in the manner well known to the art. It is essential that the metal, of which 3—3 are composed, shall be capable of resisting a high degree of heat, and for such reason I prefer to form the same of nichrome.

Preferably the channel through said castings is much narrower at the top, widening out at the bottom, as illustrated at 4—4 in Fig. 1, to the end that (when cold water is circulated through said channels) the cooling effect may be greater as the glass approaches the narrow part of opening 2.

For the purpose of controlling and, if desired, entirely shutting off the flow of glass through opening 2, a plug 5 is provided, which may be raised and lowered by any suitable power, not shown.

If desired instead of forming the slots 4—4 of greater cross-sectional area at the bottom than at the top thereof, they may be of uniform cross-sectional area, as shown at 4'—4' in Fig. 3. As shown in Figs. 1 and 3, the temperature regulating channels are located in the bottom wall of the furnace or fore-hearth, but if desired suitable temperature regulating channels may be located below the wall of the furnace or fore-hearth, as shown for example at 4″, Fig. 4. In Fig. 4, I have shown but one such temperature regulating channel, the glass being exposed on the opposite side from said channel to the atmosphere. If desired, however, the construction shown in Fig. 6 may be adopted, in which 4³—4³ are two castings of heat resisting metal, as nichrome, pivoted at 6—6 beneath the bottom wall of the furnace or fore-hearth, one on each side of opening 2. To each of said channels 4³—4³ there is applied an adjusting screw 7—7, to the end that the lower portions of said channels may be adjusted toward and from each other to regulate the width of the slot between the two.

Referring to Fig. 5, 8 is an opening at the end of the fore-hearth or furnace, through which opening glass is permitted to flow in a shallow stream, as shown at 9, over a hollow water-cooled casting 10, of nichrome steel, a gate 11 being provided, which can be lowered to close said opening, or raised to open the same.

Referring again to Fig. 1, 12—12 represent edge gripping rolls, preferably roughened or corrugated, a pair of said rolls being located at the opposite edges of the sheet to overcome the narrowing tendency thereof. These rolls are geared together in any suitable manner and are driven by a shaft 13 through bevel gears 14 and a sprocket chain 15 connected to a moving part of the mechanism, as will be hereinafter described. 16 is a power shaft located on one side of the machine and connected to shaft 17 by suitable gearing. 16′ is a second shaft located above shaft 16 and suitably geared to shaft 17′ located above shaft 17. On the four shafts 16, 16′, 17, 17′ are suitable sprocket wheels. A sprocket chain 18 passes over sprocket wheels on shafts 16, 16′ and another sprocket chain 18′ passes over sprocket wheels on shafts 17, 17′. There are two sets of these sprocket chains on either side of the sheet of glass, provided with gripping devices which grip the sheet at the edge portions thereof, such edge portions being thicker than the main body of the sheet between the edges and, if desired, the gripping devices at the outer edges of the sheet may be connected together by suitable connections extending entirely across each face of the sheet.

Shafts 16, 17, 16′ and 17′ are mounted in bearings 70, carried at the free ends of levers 71, pivoted at 72 to fixed portions of the machine. The bearings are acted upon by springs 19, whose tension may be adjusted by screws 73, in a well-known manner. At the centers of the chains between the upper and lower sets of shafts, adjustable bearings 20 are provided, carried at the free ends of levers 74, and held inward by adjustable springs 75. In bearings 20, are journaled cross-rollers 76 which bear on the inner flights of the chains, to hold them in intimate gripping contact with the sheet.

Power is applied through the shaft 16, which is connected in any desired manner with any suitable motor, and through said shaft and the connected gearing, power is applied to shaft 16′ and shafts 17 and 17′, and, by means of sprocket chain 15, power is applied to beveled gearing 14, and through the same and shaft 13 to the width-maintaining rolls 12—12.

The direction of motion is such that the inner flights of the chains adjacent to each other move downward so as to draw the sheet of glass downward in a substantially vertical direction. As the glass emerges from between grip chains 18—18, it is acted upon by any suitable scoring device 21. The specific construction of this scoring device forms no part of the present invention and therefore need not be specifically described herein. Preferably it is of the construction shown and described in U. S. application by Busard, Serial No. 270,323, filed January 9, 1919, such being an intermittently acting scoring device, which, at stated intervals, effects a transverse score across one face of the sheet of glass. While the scoring device shown in said Busard application is preferred, any other suitable automatically operating scoring device may be employed.

After the glass passes scoring device 21, it passes between idle rolls 22—22, one of which is preferably spring pressed, as shown at 23.

Referring to Figs. 1 and 2, 24 is a lever fulcrumed at 25 in the frame work of the machine, counterbalanced by a weight 26 exterior to the front of the machine and having an arm 27 projecting inward in the path of the downward moving sheet of glass 28, a stop 29 being provided to limit the upward movement of the arm 27. Mounted in a bracket 30 on the framework of the machine, and above the outward projecting arm of lever 24 is an electrical contact 31, which is connected by a suitable conductor 32 with motor 33, the motor shaft 34 of which has a pinion 35 meshing with gear 36, on the shaft of which is a pinion 37 meshing with gear 38 fast on shaft 39, on which are secured two cams 40 and 41, these cams being in the form of grooves to receive and actuate suitable rollers in a well-known manner.

Keyed to a shaft 42 is a lever 43 supporting slatted carrier 44. On shaft 42 is a pinion 45 engaged by a rack 46 formed in the under side of arm 47, which carries at its other end a roller 48 engaging in cam groove 40, the end of said arm being preferably forked to straddle shaft 39.

When the sheet of glass depresses the inner end 27 of lever 24 and closes contact 31, the motor 33 is started, thus driving cam shaft 39 and cam 40, turning shaft 42 through rack and pinion 45 and 46 to move the carrier 44 from an approximately vertical position, shown in Fig. 1, downward into horizontal position, carrying the severed sheet of glass with it.

49 is a carriage supported, through depending arms 50, by flanged wheels 51 traveling on tracks 52 and 53, which tracks at their right hand ends are substantially horizontal, but at their left hand ends are downwardly inclined as shown at 52'—53'. The carriage 49 is in the form of a slatted table, the slats being arranged to alternate with the slats of the carrier 44 to the end that the slats on said carrier may pass between the slats on the carriage 49 when said carrier is in horizontal position, thus laying sheets on the slats of the carriage while the slats of the carrier 44 are depressed slightly below the latter, as shown in Fig. 2.

54 is a link connected at one end to the extended shaft 55 of one of the flanged wheels 51 (as shown in Fig. 2), and at the other end to a lever 56 fast on a shaft 57, to which shaft is also secured a short lever 58, connected by a link 59 to cam roll 60, moving in cam slot 41. This cam 41 is so timed that just at the instant when carrier 44 has laid the severed section of the sheet of glass on carriage 49, link 56 is moved from right to left in Fig. 1, thus advancing carriage 49 from right to left. As it advances, it travels down the inclined portions 52', 53' of the track, and the sheet of glass is laid on leer rolls 61, the slats of carriage 49 passing between rolls 61 as will be understood from an inspection of Fig. 2.

Cams 40 and 41 are so timed that when carriage 49 is in the act of laying the glass upon leer rolls 61, the movement of carrier 44 is reversed and it is again elevated into the position shown in Fig. 1; and when leer rolls 61 have carried the sheet of glass beyond the carriage 49, the movement of said carriage is reversed and it is returned to the position shown in Fig. 1.

These two sets of movements, to wit, the downward and upward movements, of carrier 44 and the forward and backward movements of the carriage 49, are effected in a single revolution of the cam shaft 39, the shaft being brought to rest at the end of each revolution.

When the weight of the sheet of glass 28 is removed from lever 24, the weight 26 depresses the outer end of said lever and breaks the contact 31, means being provided for maintaining the current supply to the motor, which will be now described. 62 is a bell crank lever bearing a roller 63 operated upon by a cam surface 64 at the instant when the machine is at rest, said cam surface 64 operating to depress the other arm 65 of the bell crank so as to break electrical contact 66. The arm 65 of the bell crank, however, is operated upon by a spring 67 so that the moment roller 63 is relieved from the action of cam 64, spring 67 closes the contact 66, whereby current is directed to motor 33.

At the instant when the contact 31 heretofore described is closed, contact 66 is open, contact 31 merely serving to supply current to the motor to start the same. The instant the motor is started the cam 64 releases the roller 63 and contact 66 is closed, so that when contact 31 is subsequently broken by the passage of the sheet of glass off of the end of the lever 27, current continues to be supplied to the motor until the parts have made one complete revolution, when cam 64 again contacts with roller 63 and opens the contact 66.

By this arrangement the movement of the motor is only initiated by contact 31, which movement, however, is not interruped when said contact is broken.

In order to insure that the parts will come to rest with cam surface 64 in contact with roller 63, with contact 66 broken, a contact 68, attached to the under side of the arm 65 of the bell crank lever, is provided, which contact, through a conductor 69, operates a suitable dynamic brake (not shown) to instantly stop the motor.

*Operation.*—The plug 5, being removed from the opening 2, the molten glass flows through said opening between the coolers 3, and, as it emerges from the bottom of the opening its edges are seized by the width-maintaining rolls 12. As the sheet of glass continues to descend, it is gripped between the chains 18, 18' and pulled downward until its lower edge very nearly, but not quite, contacts with the arm 27 of lever 24. At this point the scoring device 21 automatically moves across the face of the sheet and scores the same. When said scored line has descended below the rollers 22, the lower edge of the sheet 28 contacts with the arm 27 of the lever 24, closing the contact 31 and starting the motor. The shape of the cam 40 is such that the first movement thereof moves the carrier 44 slightly from left to right, thus breaking the sheet of glass at the scored line, whereupon the movement of the carrier 44 is reversed and it moves downward from right to left in Fig. 1 and places the sheet of glass on the carriage 49. The starting of the motor has closed the contact 66 and, as the sheet of glass moves off of the arm 27 and the lever 24, the weight 26 breaks the contact 31.

At the instant the carrier 44 lays the sheet of glass on the carriage 49, the cam 41 operating through link 59 and levers 56 and 58, advances the carriage 49 from right to left, thus laying the sheet upon the rollers 61, whereupon the cam 41 reverses the movement of the carriage 49, the cam 40 having already reversed carrier 44. At the instant when the carriage 49 has reached its position shown in Fig. 1, the cam surface 64 operates the contact 66, breaking that contact and closing the contact 68, thus applying the dynamic brake and stopping the motor. This operation is repeated for each section of the sheet of glass scored.

Any other suitable means may be employed for scoring, breaking off and delivering the broken off section of glass to the leer, the specific construction of the several devices and mechanisms herein shown not being essential to the broad inventive idea.

What is claimed is:—

1. In a machine for drawing sheet glass, a receptacle for molten glass, means permitting the molten glass to flow in sheet form vertically downward therefrom, width-maintaining devices acting on the edge-portions of said sheet, and gripping mechanism gripping and drawing the sheet vertically downward.

2. In a machine for drawing sheet glass, the combination of a receptacle for molten glass having a long, narrow slot or opening in the bottom thereof through which the molten glass flows in approximately sheet form, width-maintaining devices acting on the edges of the sheet beneath said receptacle, and sheet glass drawing mechanism gripping and drawing the sheet vertically downward.

3. In a sheet glass drawing machine, the combination of a receptacle for molten glass having an opening therein through which the glass flows vertically downward in approximately sheet form, cooling means associated with said opening to regulate the temperature of the glass flowing therefrom, width-maintaining devices, and sheet glass drawing mechanism for drawing the sheet vertically downward.

4. In a sheet glass drawing machine, the combination of a receptacle containing molten glass having an opening from which the molten glass flows in approximately sheet form, means for drawing the sheet downward, means for scoring the drawn sheet, a horizontal carriage for delivering glass to a leer, and a carrier automatically breaking the sheet along the scored line and depositing the severed section on said carriage.

5. In a machine for drawing sheet glass, the combination of a receptacle for molten glass having an oblong slot or opening in the bottom thereof, water-cooled channels arranged on opposite sides of said opening to regulate the temperature of the glass flowing through said slot or opening, width-maintaining means, vertically moving sheet-drawing mechanism drawing the sheet downward, intermittently-operated scoring mechanism for scoring the drawn sheet, and an intermittently-operated carrier for breaking the sheet along the scored line, and a carriage to which the severed section is delivered by said carrier.

6. In a sheet glass drawing machine, the combination of means for drawing a sheet of glass vertically downward with means for scoring the drawn sheet, a carrier for receiving the severed sections, a carriage to which the severed sections are delivered by said carrier, and an intermittently-operated cam mechanism controlling the movements of said carrier and carriage, and automatic mechanism controlled by said carrier and initiating the movement of said cam mechanism.

7. In a sheet glass drawing machine, the combination of means for drawing a sheet of glass, a carriage, a carrier for delivering the severed sections of the sheet to said carriage, an electric motor, a counter-balance mechanism controlled by the weight of the sheet-section when delivered to said carrier for switching current to said motor, operating devices controlled by said motor for moving said carriage and carrier, and an automatically-operated switch mechanism for cutting off the current of said motor.

8. In a machine for drawing sheet glass, the combination of a receptacle for molten glass, an opening therein through which the molten glass flows in approximately sheet form under the action of gravity, means for gripping and delivering the sheet vertically downward from said opening, means for intermittently scoring the drawn sheet, means for breaking off the sheet section below the scored line and swinging the section into a horizontal plane, and automatically-operating carrier-mechanism for receiving and delivering the horizontal sheet sections to a leer, the operation of the carrier mechanism being controlled by the drawn sheet.

9. In a sheet-glass drawing machine, the combination of a receptacle for molten glass, sheet-glass drawing mechanism gripping and drawing the sheet at its edge portions only, the central portion of the sheet being free from contact with any part of the gripping mechanism, scoring devices for said drawn sheet, and connections between said drawing mechanism and scoring devices whereby the latter is operated by the former.

10. In a sheet-glass drawing machine, the combination of a receptacle for molten glass from which the glass flows in approximately sheet form vertically downward, sheet-glass drawing mechanism gripping the sheet adjacent its edges only and drawing the sheet downward, scoring devices intermittently scoring the drawn sheet, and means for breaking the sheet along the scored line, the operation of said breaking means being controlled by the drawn sheet.

11. In a sheet-glass drawing machine, the combination of a receptacle for molten glass, sheet-glass drawing mechanism gripping and drawing the sheet vertically, scoring devices for the drawn sheet, and means for severing the sheet along the scored line, swinging the severed section into a horizontal plane, and delivering it horizontally into a leer, the operation of said severing means being controlled by the drawn sheet.

12. In a sheet glass drawing machine, the combination of a receptacle for molten glass from which the glass flows in approximately sheet form vertically downward, sheet glass drawing mechanism gripping and drawing the sheet downward, severing devices for said drawn sheet, a leer, and means for swinging the severed sections into horizontal planes and delivering them horizontally into the leer.

13. In a sheet-glass drawing machine, the combination of a receptacle for molten glass, sheet-glass drawing mechanism gripping and drawing the sheet, a leer, and means for delivering the drawn sheet edgewise, in separate horizontal sections to said leer, the operation of said means being controlled by the drawn sheet.

14. In a continuous sheet glass drawing machine, a receptacle for molten glass, means permitting the molten glass to flow in sheet form vertically downward therefrom, width maintaining devices acting on the edges of the sheet, and drawing and supporting mechanism gripping the sheet at its edges only, whereby the greater portion of the sheet remains untouched from the flowing point downward until set suitable for dividing into separate sheet sections.

In testimony whereof I have signed this specification.

ROBERT P. CALLARD.